Jan. 29, 1924.
J. D. ERRECABORDE
TURNING TRUCK FOR VEHICLES
Filed Jan. 16, 1923
1,482,121
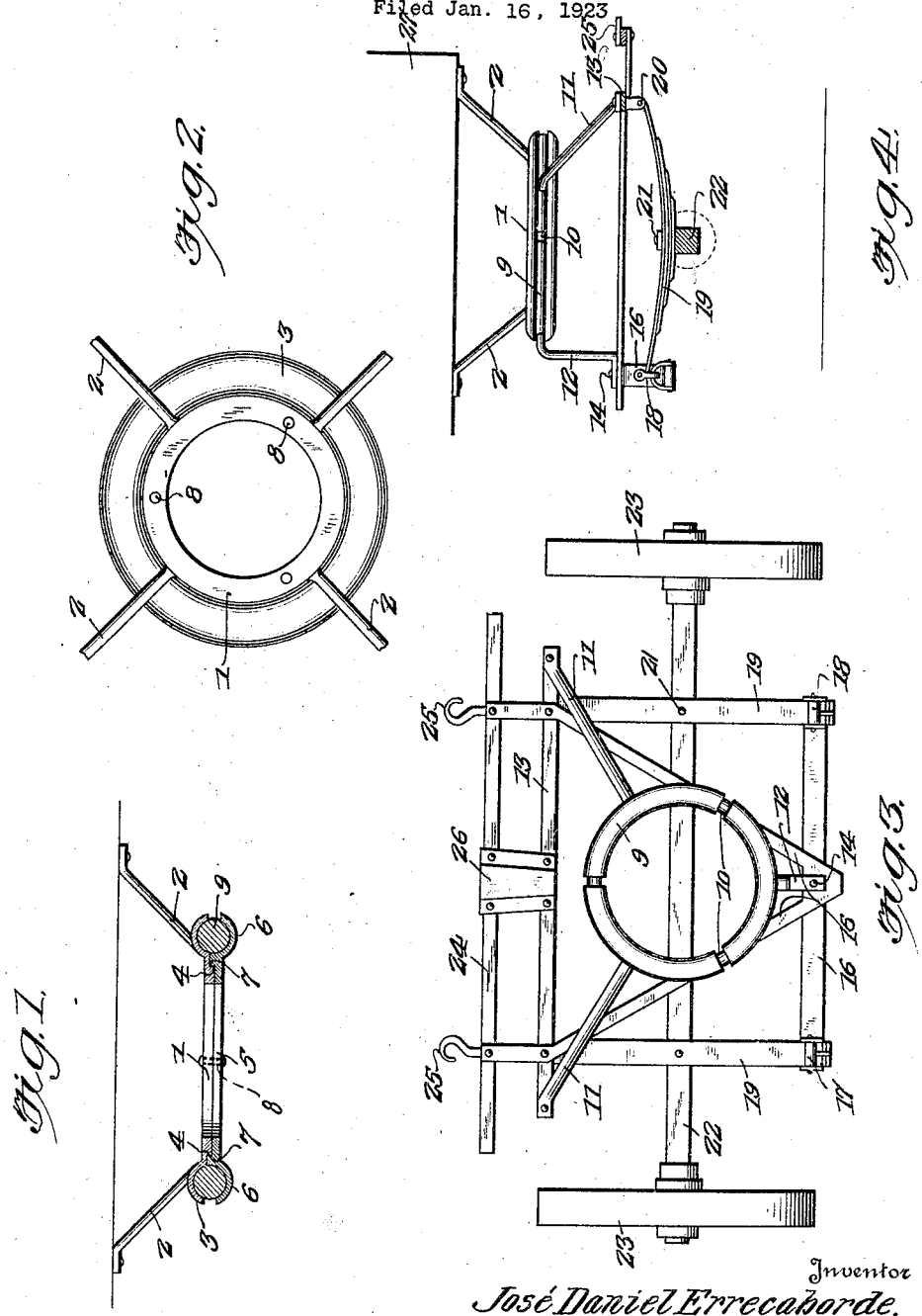
Inventor
José Daniel Errecaborde,
By Emil Bonnelycke
Attorney Patented Jan. 29, 1924.

1,482,121

UNITED STATES PATENT OFFICE.

JOSÉ DANIEL ERRECABORDE, OF BUENOS AIRES, ARGENTINA.

TURNING TRUCK FOR VEHICLES.

Application filed January 16, 1923. Serial No. 613,047.

*To all whom it may concern:*

Be it known that I, José Daniel Errecaborde, citizen of the Republic of Argentina, residing at Buenos Aires, Argentina, have invented certain new and useful Improvements in Turning Trucks for Vehicles, of which the following is a specification.

My present invention relates to certain improvements in turning trucks for vehicles of all kinds and in turning connections generally its object being to provide a new turning truck with resilient suspension for the wheels, which allows of a complete turning of the same and at the same time avoids practically all known drawbacks inherent to the ordinary pivot trucks by providing a more ample base for the vehicle.

In order that my invention may be clearly understood and easily carried into practice, a preferred embodiment of the same has been shown in the accompanying drawings wherein—

Figure 1 is a central vertical section of the double crown and ring of the turning truck together with the means for fixing same to the vehicle body.

Figure 2 is a plan view of the same.

Figure 3 shows a plan view of the turning ring with the complete truck and wheels and the links therefor and finally, Figure 4 is a side elevation of the device fixed to a vehicle frame.

The same characters of reference denote same or like parts throughout the said figures.

In the embodiment shown, the device consists of a circular frame 1 having its outer or rim portion open and curved as shown at 3 and having a number of arms 2 (in the embodiment shown, there are four arms), said arms being fixed at their free ends to the body 27 of the vehicle by means of bolts or the like (Figure 4). A second symmetrical frame 5 has also an outer curved portion 6 and is adjusted to the first-named frame by means of interfitting projections 4 and 7 formed on the inner or web portions of said frames, as shown in Figure 1, said web portions being rigidly connected to each other by means of bolts 8. The free outer edges of the rim portions 3 and 6 are spaced apart, and the whole is rigidly fixed to the body of the vehicle and provides an annular recess for the turning ring 9, which is rigidly fixed to the truck as explained hereinafter.

The said ring 9 has a number of recesses 10 for the lubrication of the annular space wherein it turns and formed by the curved rim parts 3 and 6 of the fixed frames 1 and 5 respectively. Three arms are fixed to the said turning ring and extend through the space between the outer edges of parts 3 and 6, the front ones 11 having their free ends fixed to the front bar 13 of a triangular frame, whereas the rear arm 12 is fixed at 14 to the rear apex of the said triangular frame, which latter is formed by the bars 13 and 15 duly connected to each other as may be clearly seen from Figure 3. The apex of the triangular frame rests on the central part of a spring blade 16, being fixed thereon by means of bolts or the like, said spring being supported at its ends by bolts and stirrups 17 and 18 respectively from the rear ends of the longitudinal springs 19. The front ends of the said longitudinal springs 19 are suspended by means of the stirrups 20 from the ends of the frame bar 13. 22 is the axle carrying at its ends the wheels 23 rotatable thereon, said axle 22 being fixed by means of bolts 21 or the like to the central portion of the longitudinal springs 19.

24 is the draft bar rigidly connected to the frame of the truck and having hooks 25 or other equivalent means and also a socket for the pole as shown at 26.

From the foregoing, it will be obvious that the area of the portion of the base of the vehicle resting on the truck is ample, and that the said base may be enlarged according to requirements without impairing the efficiency of the device, which as shown may be used for the front train of wheels, but which is also applicable to the rear train or to both with or without suitable connections therebetween.

The operation of the above described device is obvious from the description and the drawings and further explanation is not considered necessary.

The parts may be easily dismantled and put together whereby a solid construction may be obtained which avoids practically all drawbacks inherent to the one pivot constructions now in use.

It is obvious that many constructional and other changes may be introduced without departing from the scope of the invention as hereinafter claimed.

Having now fully described and ascertained the nature of my present invention and in what manner the same is to be carried into practice, I declare that what I claim is:

1. A turning connection comprising a crown embodying a pair of structurally-separate, circular frames having oppositely-curved outer rim portions forming an annular recess therebetween and inner web portions provided with interfitting projections, and a ring fitted in said recess, the ring and crown being rotatably related; the web portions of the frames having fastening devices rigidly connecting them together, and the rim portions having their outer edges spaced from each other to expose part of the ring; substantially as described.

2. The combination, with a pair of companion members, one of which is adapted to turn relatively to the other, of a crown embodying upper and lower structurally-separate, circular frames having oppositely-curved outer rim portions forming an annular recess therebetween and inner web portions provided with interfitting projections, a ring fitted in said recess; the web portions of the frames having fastening devices rigidly connecting them together, and the rim portions having their outer edges spaced apart; a plurality of arms on one of the frames rigidly connected at their free ends to one of the companion members, and a plurality of arms on said ring extending outwardly through the space between the spaced edges of the rim portions of the frame and rigidly connected to the other companion member; substantially as described.

3. In a turning truck for vehicles, the combination of a turning connection comprising a crown having an internal annular recess, and a ring revolubly fitting therein; and connecting means between the turning connection and the body of the vehicle and the truck axle, comprising a plurality of arms leading from the crown and rigidly secured to the vehicle body, a pair of longitudinal springs fastened at their centers to the axle, a transverse spring suspended at its ends from the rear ends of the longitudinal springs, a rearwardly-directed triangular frame interposed between the turning connection and the several springs and having its apex resting upon and fastened to the central part of the transverse spring, the front ends of the longitudinal springs being suspended from the front member of the frame, and a plurality of arms leading from the turning ring and rigidly secured to said front member and to the apex of said frame; substantially as described.

In testimony whereof I affix my signature.

JOSÉ DANIEL ERRECABORDE.